US008999471B2

(12) United States Patent
Nicola et al.

(10) Patent No.: US 8,999,471 B2
(45) Date of Patent: Apr. 7, 2015

(54) STOPPER FOR CLOSING A MEDICAL SYSTEM

(76) Inventors: Thomas Nicola, Spicheren (FR); Martin Schmidtlein, Saarbruecken (DE)

( * ) Notice: Subject to any disclaimer, the term of this patent is extended or adjusted under 35 U.S.C. 154(b) by 0 days.

(21) Appl. No.: 13/023,523

(22) Filed: Feb. 8, 2011

(65) Prior Publication Data

US 2011/0189431 A1 Aug. 4, 2011

Related U.S. Application Data

(63) Continuation of application No. PCT/EP2009/005735, filed on Aug. 7, 2009.

(30) Foreign Application Priority Data

Aug. 8, 2008 (EP) .................................. 08014174

(51) Int. Cl.
| | | |
|---|---|---|
| *B32B 1/00* | (2006.01) | |
| *B32B 3/24* | (2006.01) | |
| *B32B 25/14* | (2006.01) | |
| *B32B 27/08* | (2006.01) | |
| *B32B 33/00* | (2006.01) | |
| *A61J 1/14* | (2006.01) | |
| *B29C 47/00* | (2006.01) | |
| *B65D 39/00* | (2006.01) | |
| *B32B 3/26* | (2006.01) | |
| *B29C 47/12* | (2006.01) | |

(52) U.S. Cl.
CPC ................. *B32B 27/08* (2013.01); *B32B 3/266* (2013.01); *A61J 1/14* (2013.01); *B29C 47/0021* (2013.01); *B29C 47/128* (2013.01); *B32B 25/14* (2013.01); *B65D 39/0058* (2013.01); *B65D 2539/008* (2013.01)

(58) Field of Classification Search
None
See application file for complete search history.

(56) References Cited

U.S. PATENT DOCUMENTS

| | | | | |
|---|---|---|---|---|
| 4,465,487 A | * | 8/1984 | Nakamura et al. | ............ 604/408 |
| 4,479,989 A | * | 10/1984 | Mahal | ........................... 428/35.5 |
| 4,516,977 A | * | 5/1985 | Herbert | ........................ 604/415 |
| 4,700,857 A | | 10/1987 | Kittscher et al. | |
| 5,928,744 A | * | 7/1999 | Heilmann et al. | ........... 428/36.6 |
| 6,139,934 A | | 10/2000 | Hettinga | |
| 6,153,275 A | | 11/2000 | Yaniger | |
| 6,248,272 B1 | | 6/2001 | Yaniger | |
| 7,306,553 B2 | * | 12/2007 | Mizuo et al. | ..................... 493/87 |
| 7,550,185 B2 | * | 6/2009 | Ling et al. | .................. 428/36.91 |

FOREIGN PATENT DOCUMENTS

| | | |
|---|---|---|
| DE | 33 05 365 A1 | 9/1984 |
| DE | 36 01 016 A1 | 3/1987 |
| DE | 196 34 944 C1 | 5/1998 |
| EP | 1 205 396 A2 | 5/2002 |
| EP | 1 051 334 B1 | 6/2003 |
| EP | 1 493 681 A1 | 1/2005 |
| JP | 2007283660 A * | 11/2007 |
| WO | WO 00/56526 A1 | 9/2000 |

OTHER PUBLICATIONS

Machine Translation of JP 2007283660 A, Nov. 2007.*

* cited by examiner

*Primary Examiner* — Jeff Vonch
(74) *Attorney, Agent, or Firm* — Muncy, Geissler, Olds & Lowe, P.C.

(57) ABSTRACT

A cylindrical stopper for closing a medical system and a method for closing a medical system, and to the medical system itself, closed with the stopper of the invention.

8 Claims, No Drawings

STOPPER FOR CLOSING A MEDICAL SYSTEM

This nonprovisional application is a continuation of International Application No. PCT/EP2009/005735, which was filed on Aug. 7, 2009, and which claims priority to European Patent Application No. EP 08014174.0, which was filed on Aug. 8, 2008, and which are both herein incorporated by reference.

BACKGROUND OF THE INVENTION

1. Field of the Invention

The present invention relates to a stopper for closing a medical system, to a method for closing a medical system, and to the medical system itself, closed with the stopper of the invention.

2. Description of the Background Art

Medical systems such as medical bags are used in their millions in medicine and serve for the storing of blood or infusion solutions. For this purpose they must be completely sterile, which is typically achieved by heating to at least 100° C., more particularly to around 121° C. Furthermore, a bag of this kind must be able to be produced easily, cheaply, and in an automatic production operation, and be disposable after use on account of its low value.

Typical medical bags are disclosed in U.S. Pat. No. 4,516,977, which is herein incorporated by reference. That publication discloses bags made of plastics materials based on polyolefins, including those based on polyethylene, polypropylene, and polybutylene. Besides these homopolymers, plastics materials are specified that constitute substituted olefins, carrying, for example, methyl, ethyl, vinyl or halogen atom substituents. Copolymers or blends of such materials are also proposed therein. Cited as being particularly preferred for the bag are polyethylenes of medium to high density, high molecular weight, and narrow molecular weight distribution. In order that the contents of the bags can be run out or else that the bags can be filled, insert pieces, for example, are used, which allow access to the interior of the bag.

Such insert pieces are already known in various forms and are described in, for example, DE 33 05 365 C2 and DE 196 34 944 C1, which are both herein incorporated by reference. To fill the bags, generally, two production methods are used. In one case, the medical bags may first be filled with the fluid in question, and the insert pieces are welded into the bag subsequently, i.e., after the filling operation, with the bag being closed completely at the same time. The other known case involves the integration of the respective insert piece into the medical bag prior to the filling operation, with filling being accomplished subsequently. For this purpose, generally, a separate filling opening is used, which is formed by a gap in the edge welding of the film bag and which is sealed or welded after filling.

A further option for filling the medical bag and/or removing its contents is supplied by connections to which tubes can be connected, and by openings which are closed with a pierceable stopper. These systems are usually welded to the bag material, and are usually costly and complicated to produce.

SUMMARY OF THE INVENTION

It is therefore an object of the present invention to provide a stopper for closing a medical system, such as a bag, for example, which is suitable in a simple way for the firm—that is, durable and fluidtight—closing of an opening in the medical system. Furthermore, it is to be possible to pierce the stopper with a needle or a spike, the intention thereby being to ensure one-off or repeated removal of fluid from the medical system. It is a further object of the invention to provide a method for simply and economically closing a medical system, more particularly a medical bag.

This object is achieved, in an embodiment, by a preferably cylindrical stopper having two opposite end faces for closing a medical system, the stopper comprising a core and also optionally one or more layers surrounding the core, and the stopper comprising: (A) a core made of a plastics material comprising one or more polymers having a high resilience and selected from polyphenylene oxide, polyethylene copolymers, ethylene-vinyl acetate (EVA), styrene/ethylene/butylene block copolymer (SEB), styrene/ethylene/propylene copolymer (SEP), polypropylene (PP), medical white oil, styrene/butadiene/styrene copolymer (SBS), polybutylene (PB), ethylene/propylene/diene rubber (EPDM), ethylene/propylene plastic and styrene/butadiene/styrene block polymer (SBS); (B) optionally one or more interlayers made of a plastics material comprising one or more polymers selected from functionalized polypropylene (PP), polyethylene (PE), functionalized styrene/ethylene/butylene block copolymer (SEB), polyethylene plastomer, polyethylene copolymer, ethylene/vinyl acetate (EVA), styrene/ethylene/propylene copolymer (SEP), oil, polypropylene (PP), polyethylene (PE), styrene/isoprene/styrene block copolymer (SIS), polybutene (PB); and (C) optionally an outer layer made of a plastics material comprising one or more polymers selected from polypropylene, polyester, polyethylene plastomer, polycarbonate, polyethylene copolymer, ethylene-vinyl acetate (EVA), PCCE or SEB/SEP, PMP, PB, plasticized PVC (PVC-P) or mixtures of these, whereby the material of the core (A), in the absence of the outer layer (C), or the material of the outer layer (C) of the stopper, being fluid at temperatures of greater than 90° C.

The term "being fluid" means, in the context of an embodiment of the invention, that the material in question can soften at the stated temperature at least partly to such an extent that it enters together with the surrounding material into a bond which is durable and stable after cooling has taken place to a temperature which is situated at least 20° C. below the temperature at which the material becomes fluid.

The design of the outer layer (C) is such that it gives the core (A) and, where appropriate, the interlayer (B) an in-process stability, thereby allowing the stopper materials to be coextruded to a multilayer extrudate or stopper extrudate.

In an embodiment, the term "high resilience" can to be understood to mean that the materials of the core (A) of the stopper are selected such that the stopper still closes tightly even after repeated piercing and withdrawal of a canula.

Preferred materials for the core (A) can be polyphenylene oxide, SEPS/SEP copolymers, medical white oil, and polybutylene (PB). According an embodiment of the invention, the core A can be produced of 20% to 40% by weight of SEB, 20% to 40% by weight of medical white oil, 5% to 15% by weight of polyphenylene oxide, 10% to 30% by weight of polypropylene (PP), and up to 10% by weight of filler.

The individual layers of the stopper, and/or the core of the stopper, may further comprise fillers which are known to the skilled person. These are substances such as $TiO_2$, $SiO_2$, chalk, kieselguhr, zinc oxide, quartz, talc, and mixtures of these substances. The fillers may be present each in a fraction of up to 10% by weight in the core, and/or in the layer (B) and/or in the layer (C).

The stopper may also comprise further additives which are known to the skilled person and which typically serve for precise adjustment of the materials properties to the requirements of the particular application, and the improvement of chemical and mechanical properties. Additives of this kind include plasticizers, antioxidants, and lubricants, and are familiar to the person skilled in the art of plastics technology. The additives may be present each in a fraction of up to 10% by weight in the core, and/or in the layer (B) and/or in the outer layer (C).

The outer layer (C), which is fluid at temperatures of greater than 90° C., comprises the polymers identified below, preferably in the fractions indicated relative to the overall composition of the outer layer (C): polypropylene at 70% to 100% by weight, polyethylene copolymer at up to a maximum of 70% by weight, PCCE at 100% by weight or SEB/SEP at up to 100% by weight, PB at 80% to 100% by weight, and up to a maximum of 70% by weight of ethylene-vinyl acetate (EVA). Preferred polymer compositions for the outer layer (C) are polyethylene copolymers in combination with polypropylene; SEB/SEP in combination with polypropylene; and a mixture of polypropylene, SEB, and polyethylene copolymers.

According to an embodiment of the invention, the stopper is suitable for closing a bag, more particularly for closing a medical bag. In this context, a stopper as described above may be used whose core material (A), in the absence of the outer layer (C), or whose outer layer material (C), tends to flow at temperatures of greater than 90° C.

According to a further embodiment of the present invention, the outer layer (C) is manufactured of around 100% by weight of polyester, around 100% by weight of polycarbonate or around 100% by weight of PMP. This stopper is suitable for closing a medical system, more particularly a medical bag, the bag film surface facing the stopper, or the opening of the medical system, comprising a material which is fluid at temperatures of greater than 90° C. This ensures a durable bond between bag film and stopper, or between the tube port of the bag and the stopper.

The stopper of the invention may have a cylinder shape or cone shape or a kind of boat shape, and is suitable for closing a medical system. By the latter are meant, in the context of the invention, in the widest sense, all containers, vessels, tubes, bags, and associated connecting elements that are used within the medicotechnical sector and which in the course of appropriate use as intended may come into contact with body fluids such as blood or with fluids intended for the therapeutic treatment of the human body, such as infusion solutions, for instance. The system is preferably a bag, more particularly a bag into which a tube has been welded as a tube port. The use of the term "system" in accordance with the invention in this context further encompasses an arrangement of at least two individual parts or elements which, for the use of the system, are to be joined firmly and reliably to one another, so that there is no threat to the flawless functioning of the system. Exemplary medical systems include medical bag systems for solutions that are equipped with connectors, installation parts or connection ports and are to be connected to tubes, tube systems or tube sets in order to ensure the transport of the medical solutions for therapeutic treatment. The medical systems further include tube sets themselves which necessitate the joining of a plurality of tubes to one another, with, for example, connectors suitable for this purpose, or any other elements used that are familiar to a person skilled in the art of medical technology.

So that, in the context of the invention, a fluidtight and durable connection is formed between the stopper and the medical system, the individual parts to be connected in accordance with the invention have surfaces made of plastic. In this context it is sufficient for at least certain sections of the respective surfaces of the individual parts to be composed of plastics materials, with the certain sections being in contact with one another for the purpose of forming the connection. The surfaces of the individual parts that are in contact with one another, of the stopper and of the bag, for example, define a contact region. It remains to be stated that the contact region is restricted at least to the surface sections of plastic that are in contact with one another. In accordance with the invention, the fluidtight and durable connection of the individual parts is obtainable by contacting the surfaces with simultaneous exposure to a heat treatment at temperatures greater than 90° C., and subsequent cooling.

This should be understood to mean that the individual parts, as a result, for example, of being plugged into or onto one another, acquire a press fit which presses the mutually contacting surfaces of the individual parts against one another with a force which, on the one hand, ensures a certain dimensional stability on the part of the arrangement comprising the individual parts to be connected, before the firm and durable connection is formed, and, on the other hand, fixes these surface sections of the individual parts, that form in the contact region, with one another, in intimate material contact of the mutually contacting surfaces.

In accordance with the invention, appropriate choice and harmonization of the polymers that make up the plastics materials in the contact region produces a connection arrangement which can be formed durably and reliably in a single heat treatment procedure, more particularly in the course of an autoclaving procedure, without the need to use additional adhesion, caulking or sealing materials. Subject matter of the invention more particularly is the production of a durable connection between a medical system, preferably between the bag system and the stopper of the invention, which connect firmly to one another on subsequent heat treatment, more particularly heat sterilization, and subsequent cooling.

In accordance with the invention, the term "plastics material" may be taken to mean those materials whose substantial constituents are composed of macromolecular organic compounds, where the plastics materials may comprise one or more polymers or else may simply be referred to as polymers, with polymers including, more particularly, homopolymers and copolymers (including block copolymers and/or graft copolymers) and also mixtures (blends or compounds) of the stated substances.

An important criterion for the inventive selection and assignment of a polymer to a plastics material, in respect both of the outer layer (C) of the stopper and of the medical system (more specifically in the contact region in each case), is the dimensional stability of the polymer under sterilization conditions (fluidity). The dimensional stability is dependent substantially on the softening temperature, the physical hardness of the substances used.

According to one embodiment of the invention, the stopper comprises the polymer or the polymer mixture with the low softening temperature in a fraction of up to 40% by weight, based on the polymer of the medical bag, and has a hardness which is lower than that of the first individual part. As a result, adhesion is improved, if the viscosities of the materials are harmonized such that parts of the polymer of the bag are located on the surface of the stopper, or the polymer of the outer layer (C) comprises low molecular mass constituents. Consequently, the invention can in principle be "adapted" to different heat treatments at different temperatures.

The temperature which is of particular interest for the softening of the parts to be connected at the surface, in other words the temperature of the heat treatment, is the temperature at which the sterilization, or steam sterilization, is typically performed. In this context, for the purposes of the invention, steam sterilization means, generally, a method for killing or deactivating (viruses) all microorganisms, including the highly resistant, persistent form, and the materials of the invention may be subjected more particularly to steam sterilization in an autoclave with steam at not less than 116° C., corresponding approximately to one atmosphere of overpressure, referred to as autoclaving or autoclaving treatment, without suffering damage. According to one general embodiment of the invention, the heat treatment is carried out at a temperature in the range from 90 to 130° C., preferably in the range from 116 to 121° C. These temperatures are sufficient to ensure a fluidtight, firm and durable fit on the part of the stopper.

According to one general embodiment of the invention, the stopper is harmonized in terms of its size with a guide sleeve mounted on the bag, or with a tube port mounted on the bag. The stopper in this case has a diameter in the range from 3 to 15 mm, preferably in the range from 6 to 9 mm. The diameter of the stopper here may be selected such that it corresponds to the internal diameter of the sleeve/tube. Alternatively, it may be dimensioned such that a widening of the sleeve/tube occurs when the stopper is positioned. The length of the stopper of the invention is variable, and varies in the range from 3 to 15 mm, preferably in the range from 5 to 8 mm. The stopper of the invention may also be present in a kind of boat shape, and has in this case a width of 10 to 40 mm and a thickness of 6 to 20 mm, and also a length of 3 to 15 mm. The stopper preferably has at least one, preferably cylindrical, preferably central, channel, which has a diameter in the range from 6 to 9 mm. The stopper may also have two or more channels. This at least one channel makes it easier, for example, to fill the medical system via the channel, and/or to insert a spike. The diameter of the channel is selected such that a spike can be introduced with comparative ease and, when this is done, bears tightly against the stopper.

According to one embodiment of the invention, the stopper has a notch at least on one of its end faces, and this notch, for example, facilitates the piercing and withdrawal of a needle, and also lessens destruction of the surface. Another effect of these one or more notches is to ensure the reliable, i.e., fluidtight reclosing of the stopper even after repeated piercing and withdrawal with a needle or spike. The depth of these one or more notches is variable, and generally may vary in the range from 1 to 3 mm, and is preferably 1 mm. According to one embodiment of the invention, this notch takes the form of a "Y" or "X". The notch or notches may be present only on the end face facing away from the bag, or on both end faces of the stopper. According to one embodiment of the invention, Y-shaped notches are present at the opposite end faces and are arranged at an angle to one another in the range from 30 to 180°, preferably an angle of 180° to one another. These notches facilitate the piercing of a canula into the stopper of the invention, and support virtually tight closure of the core material following the withdrawal, even in the case of repeated piercing with a canula or spike.

According to another embodiment of the invention, at least one end face of the stopper of the invention is covered at least sectionally with a film, which is preferably joined firmly, more preferably welded, to the outer layer of the stopper (C) or to the core (A). This film is produced preferably from a material which is suitable for producing film bags, and preferably corresponds to the bag material, and ensures a fluidtight shielding of the bag's contents from the materials of the stopper. This ensures that migratable constituents of the stopper material such as plasticizers are unable to pass into the fluid in the bag. According to a more preferred embodiment of the invention, the inner layer of the film bag material in this case is oriented toward the interior of the bag. According to a further version of the invention, the channel is sealed or closed by a closure stopper, an example being a cylindrical object. The closure stopper is a preferably cylindrical object which seals the channel. According to one particularly preferred embodiment of the invention, the closure stopper can be pierced with a canula.

A further subject of the present invention is a method for producing the stopper of the invention, comprising the following steps:

(a) producing a single-layer or multilayer extrudate by coextruding the plastics for the layers (A), optionally (C), and optionally (B), and also, optionally, producing said at least one channel during the coextrusion, (b) optionally cooling the extrudate produced in step (a), and optionally winding it to form a coil, (c) optionally applying a notch, (d) optionally coating the end face of the extrudate with a film, (e) cutting the extrudate to the desired length of the stopper, (f) optionally applying a further notch, (g) optionally coating the other end face of the stopper with a film as a tamper-evident closure, and (h) optionally closing said at least one channel with at least one closure stopper and/or film.

According to a further embodiment of the invention, the stopper of the invention is used for closing a medical system, more particularly for closing and/or for producing a medical bag. The method for closing or producing the medical bag comprises the following steps:

(a*) providing the stopper of the invention, said stopper being provided optionally with one or two notches and optionally with one or two coatings, and which optionally has at least one channel, and providing two bag films, (b*) placing the stopper between the two bag films, (c*) producing the medical bag by welding the bag films and welding and performing a heat treatment for joining the stopper to the bag, and (d*) optionally coating the outer end face of the stopper with a film, and (e*) optionally closing said at least one channel with at least one film and/or with at least one closure stopper.

In this way, simply, a medical bag is obtained, and fluid can be exchanged between the interior and exterior of the bag via the incorporated stopper.

The medical bag can also be produced by blow-molding of the bag around the stopper of the invention, and implementation of a heat treatment. Following blow-molding, which is carried out typically at high temperatures >90° C., the stopper closes fluidtightly and durably with the film material.

In order to produce a durable and fluidtight connection between the stopper and the bag, it is an advantage, in accordance with one further embodiment of the invention, if the stopper of the invention, at the contact point with the bag material, has a lip which is extruded onto the stopper. According to a further embodiment of the invention, this lip may also be pressed on thermally. It is likewise an advantage if the stopper has a boat shape. If a stopper with a preferably cylindrical channel is used, it may be closed by being pressed together and subsequently welded, by application of a film and/or of a small plate, and/or by insertion of a closure stopper, such as a cylindrical object. Via the cylindrical channel, the medical system or the bag can be filled in a simple way, and, moreover, the channel facilitates the removal of the bag's contents via a spike, for example.

A further aspect of the invention is a method for closing a medical system, more particularly a medical bag, by means of the stopper of the invention, comprising the following steps:

(a') providing the medical system and the stopper or the stopper extrudate, (b') introducing the stopper of the invention into an opening of the medical system, (c') optionally coating the other side of the stopper with a film as tamper-evident closure, (d') carrying out a heat treatment for joining the outer layer (C) of the stopper to the medical system, and (e') optionally closing the at least one channel with at least one film and/or at least one closure stopper.

For the sterile covering of the opening which is now sealed with the stopper of the invention, a tear-off film is applied as a tamper-evident closure. The opening of the medical system in this case may be, for example, an opening in the bag film, or a tube port.

The stopper of the invention may close flush with the surface of the opening, or in accordance with another embodiment of the invention may also be set back by a range of 1 to 10 mm, thereby facilitating the piercing of the stopper with, for example, a canula or a spike.

The heat treatment in step (d') may be a heat sterilization procedure, which has already been described above.

According to one preferred embodiment of the invention, a film bag is used as medical system. The stopper in this case is provided in the form of an extrudate, which is supplied directly to a bag making machine, and is cut to the desired length not until immediately prior to step (b'), in other words prior to the actual introduction of the stopper into the tube port of a bag. By this means, advantageously, the closing of the medical system, more particularly the bag, is greatly simplified. Steps such as the individualization, preliminary sorting, and orientation of the typically pre-cut stoppers are not necessary in this case, since the stopper in the form of the extrudate can be supplied, before being cut to size, precisely to the opening of the medical system. The stopper extrudate may likewise also be cut to length not until immediately after step (b').

The method of the invention for closing a medical system, more particularly a medical bag, may be preceded by the production of the medical bag, with the following step:

(a¹) producing a medical bag by welding a tube between two films from which, in a further production step, the medical bag is produced.

In order to achieve a durable and fluidtight connection between the tube and the bag it is an advantage in this case if the tube, at the point of contact with the bag material, in the region of the plane between the top and bottom film webs, has a lip which is extruded onto the tube. According to a further embodiment of the invention, this lip may also be pressed on thermally. Lip tubes of this kind are known to the skilled person.

The invention further encompasses apparatus for implementing the method described above, and also a medical system producible by means of the method of the invention.

The invention is illustrated in more detail by reference to the examples below.

DETAILED DESCRIPTION

Example 1

Extrusion of a stopper on a multilayer extrusion line

A stopper extrudate is produced on a multilayer extrusion line with water cooling calibration, with a diameter of 8 mm, as follows:

A (core):—45-type extruder with shearing/mixing section, output 15 kg/h; material APP 304 from Polycine, Germany; operating temperatures 200° C.

B (interlayer):—none

C (outer layer):—30-type extruder with shearing/mixing section, output 1 kg/h; operating temperature 200° C.; material APP 306 from Polycine, Germany The coextruded stopper extrudate is wound up as a coil with a length of around 400 m.

Example 2

Application of Y-shaped notches 1 mm deep into a stopper

The stopper extrudate produced in accordance with example 1 is processed further on an FFS machine for producing medical film bags. The stopper extrudate is notched at the end faces, and the end face facing the bag interior is welded with a piece of bag film and punched flush. The stopper, with the coated side forward, is then inserted into the tube port of the stopper, and an aluminum/PP film, as a tamper-evident closure, is applied and welded onto the uncoated end face of the stopper, which protrudes from the bag, and onto the tube surround. Stopper and tube port, which is manufactured from the material APP1 07-S from Polycine, Germany, finish flush with one another. The welding operates by means of conventional thermal welding, with a temperature of 120-150° C. The weld strength can be adjusted via the welding temperature, the pressure, and the welding time. The welding time is typically in the range from 0.5 to 4 seconds, preferably in the range from 1 to 3 seconds, more preferably 2 seconds. The sealed bag is heat-treated at 121° C., under standard sterilizing conditions.

Example 3

Production of a further stopper extrudate and closing of a medical bag

In the same way as in example 1, a stopper extrudate is produced, with a diameter of 6 mm, as follows:

A (core):—material APP 304 from Polycine, Germany; output 12 kg/h; operating temperature 220° C.

B (interlayer):—none

C (outer layer):—material APP310 from Polycine, Germany; operating temperature 190° C.; closing of the bag with the stopper of example 3

The end face of the stopper extrudate is provided with an X-shaped notch 0.5 mm deep, and a stopper is cut to a length of 8 mm. The end face of this stopper, which is oriented toward the bag's interior, is provided with an APP 114 film whose inner layer faces the bag's interior. The stopper is then introduced into the tube port of a medical bag and is placed in such a way that it is set back by 1 mm from the finishing edge of the tube port. Subsequently, a PET/PP film tamper-evident closure is applied flush to the tube port, more particularly by thermoforming. In a sterilizing operation thereafter, at 121° C., the stopper is joined to the tube port.

Example 4

Production of a further stopper strand in a method based on that of example 1, with a diameter of 7 mm A (core):—material APP 304 from Polycine, Germany; output 14 kg/h; operating temperature 220° C.

B (interlayer):—material APP 310; output 1 kg/h; operating temperature 220° C.

C (outer layer):—material polypropylene, APP 305 from Polycine, Germany; output 2 kg/h; operating temperature 190° C.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A stopper having two opposite end faces for closing a medical system, the stopper comprising:
    a core made of a plastics material comprising one or more polymers having a high resilience and selected from polyphenylene oxide, styrene/ethylene/propylene copolymer (SEP), medical white oil and polybutylene;
    optionally one or more interlayers made of a plastics material comprising one or more polymers selected from functionalized polypropylene (PP), polyethylene (PE), functionalized styrene/ethylene/butylene block copolymer (SEB), polyethylene plastomer, polyethylene copolymer, ethylene/vinyl acetate (EVA), styrene/ethylene/propylene copolymer (SEP), oil, polypropylene (PP), polyethylene (PE), styrene/isoprene/styrene block copolymer (SIS), or polybutene (PB); and
    optionally an outer layer made of a plastics material comprising one or more polymers selected from polypropylene, polyester, polycarbonate, polyethylene copolymer, polyethylene plastomer, ethylene-vinyl acetate (EVA), PCCE or SEB/SEP, PMP, PB, plasticized PVC (PVC-P) or mixtures of these,
    wherein the material of the core, and when present the material of the outer layer of the stopper, softens at a temperature of 90° C. to such an extent that it enters together with a surrounding material into a bond after cooling to a temperature at least 20° C. below the temperature at which the material becomes fluid, and the stopper having a boat shape with a width of 10 to 40 mm, a length of 3 to 15 mm, and a thickness of 6 to 20 mm and being characterized in that it has at least one channel having a diameter of 6 to 9 mm.

2. The stopper as claimed in claim 1, wherein the channel is closed by a closure stopper.

3. The stopper as claimed in claim 2, wherein the closure stopper is a cylindrical object.

4. The stopper as claimed in claim 1, wherein at least one end face of the stopper is covered at least sectionally with a film made of a material which is suitable optionally for producing a medical bag.

5. The stopper as claimed in claim 4, wherein the stopper comprises said outer layer, and
    wherein the film is welded or bonded adhesively to the outer layer of the stopper.

6. A stopper, comprising:
    a core made of a plastics material comprising one or more polymers selected from polyphenylene oxide, styrene/ethylene/propylene copolymer (SEP), medical white oil and polybutylene;
    one or more interlayers made of a plastics material comprising one or more polymers selected from functionalized polypropylene (PP), polyethylene (PE), functionalized styrene/ethylene/butylene block copolymer (SEB), polyethylene plastomer, polyethylene copolymer, ethylene/vinyl acetate (EVA), styrene/ethylene/propylene copolymer (SEP), oil, polypropylene (PP), polyethylene (PE), styrene/isoprene/styrene block copolymer (SIS), and polybutene (PB);
    an outer layer made of a plastics material comprising one or more polymers selected from polypropylene, polyester, polycarbonate, polyethylene copolymer, polyethylene plastomer, ethylene-vinyl acetate (EVA), PCCE or SEB/SEP, PMP, PB, plasticized PVC (PVC-P) or mixtures thereof; and
    a channel having a diameter of 6 to 9 mm,
    wherein the material of the core and the material of the outer layer of the stopper soften at a temperature of 90° C. to such an extent that it enters together with a surrounding material into a bond after cooling to a temperature at least 20° C. below the temperature at which the material becomes fluid, and
    wherein the stopper has a width of 10 to 40 mm, a length of 3 to 15 mm, and a thickness of 6 to 20 mm.

7. The stopper according to claim 6, wherein the stopper has two opposite end faces, and
    wherein the channel extends between and connects the two opposite end faces.

8. A stopper, comprising:
    a core made of a plastics material comprising one or more polymers selected from polyphenylene oxide, styrene/ethylene/propylene copolymer (SEP), medical white oil and polybutylene; and
    a channel having a diameter of 6 to 9 mm,
    wherein the material of the core softens at a temperature of 90° C. to such an extent that it enters together with a surrounding material into a bond after cooling to a temperature at least 20° C. below the temperature at which the material becomes fluid, and
    wherein the stopper has a width of 10 to 40 mm, a length of 3 to 15 mm, and a thickness of 6 to 20 mm.

* * * * *